United States Patent
Ohtomo et al.

[11] Patent Number: 5,909,311
[45] Date of Patent: Jun. 1, 1999

[54] OBJECT REFLECTOR DETECTING APPARATUS

[75] Inventors: Fumio Ohtomo; Kunihiro Hayashi; Jun-ichi Kodaira; Hiroyuki Nishizawa; Kenichiro Yoshino, all of Tokyo, Japan

[73] Assignee: Kabushiki Kaisha Topcon, Tokyo, Japan

[21] Appl. No.: 08/851,647

[22] Filed: May 6, 1997

Related U.S. Application Data

[62] Division of application No. 08/265,145, Jun. 24, 1994, Pat. No. 5,703,718.

[30] Foreign Application Priority Data

Jun. 25, 1993 [JP] Japan ................................. 5-155608

[51] Int. Cl.⁶ .............................. G02B 5/30; G02F 1/01; G01C 15/00; G01J 4/00
[52] U.S. Cl. .......................... 359/494; 250/225; 356/365; 33/286
[58] Field of Search .................... 359/485, 487, 359/494, 495, 501, 834, 836; 250/225, 227.26, 559.06, 559.09; 356/152.3, 364, 365, 369, 141.3, 141.4; 33/286

[56] References Cited

U.S. PATENT DOCUMENTS

| | | |
|---|---|---|
| 3,062,087 | 11/1962 | Zandman et al. . |
| 3,709,580 | 1/1973 | Fugitt et al. . |
| 3,804,522 | 4/1974 | Smith . |
| 3,812,374 | 5/1974 | Tuhro . |
| 4,523,849 | 6/1985 | Stone . |
| 4,639,740 | 1/1987 | Hamilton . |
| 5,033,828 | 7/1991 | Haruta . |
| 5,049,757 | 9/1991 | Hölzl . |
| 5,118,191 | 6/1992 | Hopkins . |
| 5,157,460 | 10/1992 | Hino . |
| 5,223,956 | 6/1993 | Kramer er al. . |
| 5,703,718 | 12/1997 | Ohtomo et al. ................. 359/494 |

FOREIGN PATENT DOCUMENTS

| | | |
|---|---|---|
| A-0491551 | 6/1992 | European Pat. Off. . |
| A-0595271 | 4/1994 | European Pat. Off. . |
| A-3912406 | 10/1990 | Germany . |
| 6-137870 | 5/1994 | Japan . |

*Primary Examiner*—Ricky D. Shafer
*Attorney, Agent, or Firm*—Thelen Reid & Priest LLP

[57] ABSTRACT

An object reflector detecting apparatus for identifying an object reflector by emitting a light from a polarized light source toward the object reflector and then detecting a reflected light from the object reflector characterized in that the light emitted from said polarized light source is a polarized light of which direction of polarization is specially defined, the polarized lights between said reflected light and said emitted light are different in the direction of polarization, and said object reflector detecting apparatus is adaped to detect only a component of the direction of polarization from said object reflector.

15 Claims, 11 Drawing Sheets

OBJECT REFLECTOR DETECTING APPARATUS

This is a divisional of U.S. application Ser. No. 08/265,145, filed Jun. 24, 1994, now U.S. Pat. No. 5,703,718

BACKGROUND OF THE INVENTION

1. Field of the Invention

The present invention relates to an object reflector detecting apparatus for determining the position of markings or installations by emitting a light from a polarized light source and then by detecting a specified reflector.

2. Description of Background Art

The object reflector detecting apparatus has been used for determining the height level in the works of the civil engineering or the architecture.

Recently, a semiconductor visible laser has been put to practical use and thus an object reflector detecting apparatus using the semiconductor visible laser has been developed. However, the output of the semiconductor visible laser is limited in view of safety of a worker and therefore the measurement accompanied with confirmation by visual observation is limited within a relatively short working distance.

Japanese Patent Application No. 289042/1992 filed on Oct. 27, 1992 discloses a rotary laser irradiating apparatus in which the position of a specified reflector arranged at a predetermined position is reciprocally scanned by a laser beam in order to extend the working distance.

In the rotary laser irradiating apparatus disclosed in Japanese Patent Application No. 289042/1992, a specified pattern is formed on the reflector in order to surely detect the object reflector.

However, since the object reflector detecting apparatus is used in various places, it is impossible to discriminate if the reflected signal pattern is that from the object reflector or from a non-object reflector and therefore it is difficult to perfectly exactly identify the object reflector and the non-object reflector and thus a scanning operation would be sometimes caused at an erroneous position.

Especially, when the laser beam from the rotary laser irradiating apparatus perpendicularly strike a non-object reflector having a reflecting surface such as a glittering member, the incident optical axis and the reflection optical axis correspond with each other and thus an intensive reflected light (hereinafter referred to "regular reflection light") enters into a detecting section of the apparatus. Accordingly, when the regular reflection light would take an arrangement similar to that of the predetermined pattern signal, the scanning error will be caused although the distance between the apparatus and the non-object reflector is long.

In addition, when there is any glitter flat member such as a glass plate near a working site, an other optical path would be sometimes formed between the apparatus and the specified reflector. In such a case, there is a problem that an erroneous scanning operation would be caused to the virtual image of the glitter member by detecting a reflected light (hereinafter referred to "multiple reflection light") of said other optical path.

SUMMARY OF THE INVENTION

It is, therefore, an object of the present invention to provide an object reflector detecting apparatus which can surely identify the predetermined object reflector with effectively expelling the reflected lights from any other members than the specified object reflector.

According to the present invention, there is provided an object reflector detecting apparatus for identifying an object reflector by emitting a light from a polarized light source toward the object reflector and then detecting a reflected light from the object reflector characterized in that the light emitted from said polarized light source is a polarized light of which direction of polarization is specially defined, the polarized lights between said reflected light and said emitted light are different in the direction of polarization, and said object reflector detecting apparatus is adapted to detect only a component of the direction of polarization from said object reflector.

(Principles of the Invention)

1. The method for eliminating the regular reflection light is based on a fact that the direction of polarization of the regular reflection light is kept in the direction of polarization of the emitted light from the polarized light source of the object reflector detecting apparatus.

That is, it is possible to detect only the reflected light from the object reflector and thus to eliminate the regular reflection light by defining the light emitted from the polarized light source to a predetermined direction of polarization, reflecting the emitted light by the object reflector while changing its direction of polarization, and then detecting only the light having the predetermined direction of polarization. In this case, the object reflector includes a birefringent member to change the direction of polarlization.

The polarized lights used in the present invention include both a circularly polarized light and a linearly polarized light. The direction of polarization in the circularly polarized light means right-hand and left-hand rotations and the direction of polarization in the linearly polarized light means two directions of the light orthogonally crossing with each other.

The means for reflecting the light at the object reflector with changing the direction of polarization may be formed by a birefringent member producing a quarter-wave phase difference on the orthogonally crossing axes, the birefringent member being mounted on a whole surface of the reflector. The direction of polarization of the light can be changed with being reciprocally passed through the birefringent member.

Figure 1:
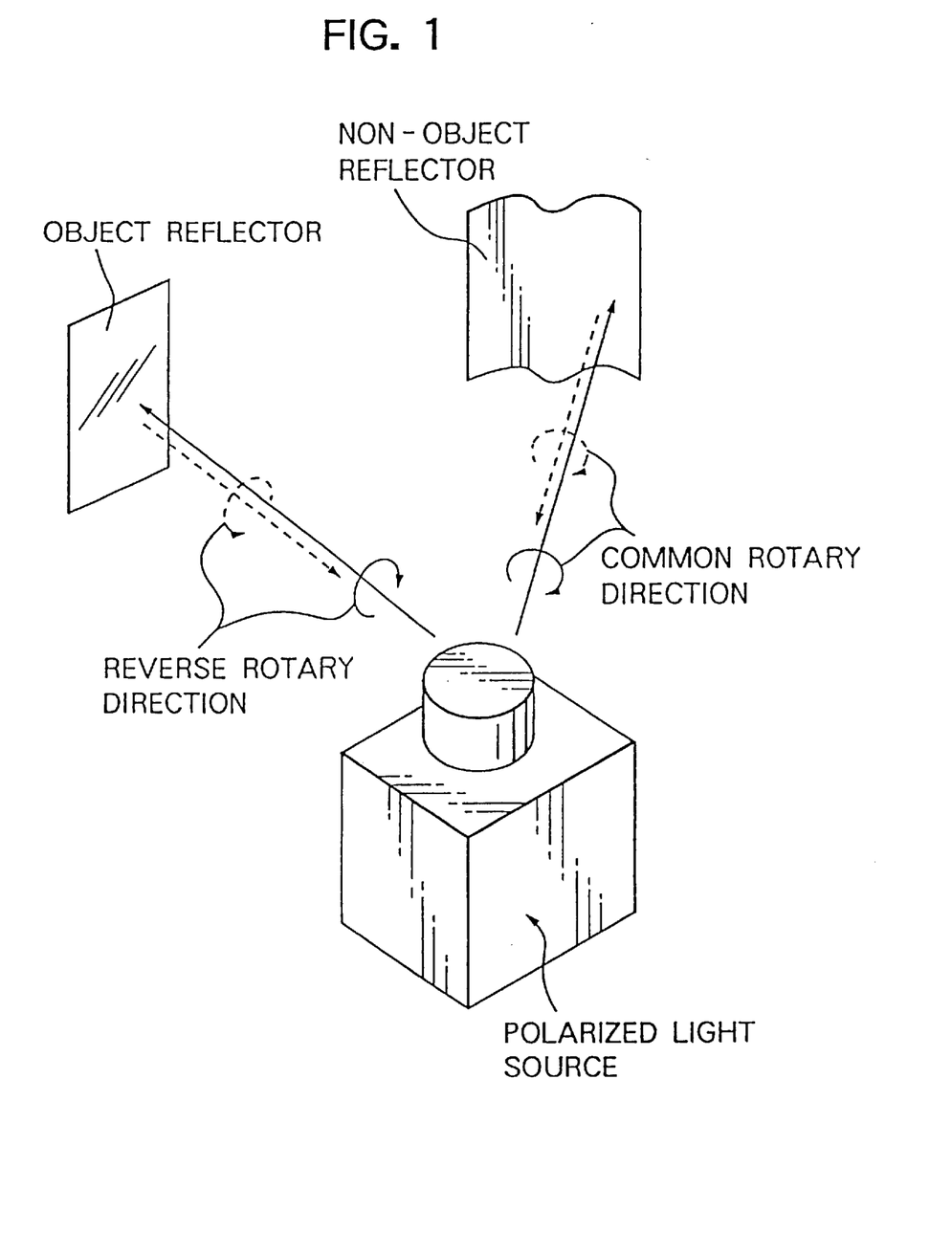
FIG. 1 is a schematic view showing a reflection of the circularly polarized light caused by the object reflector.
Figure 2:
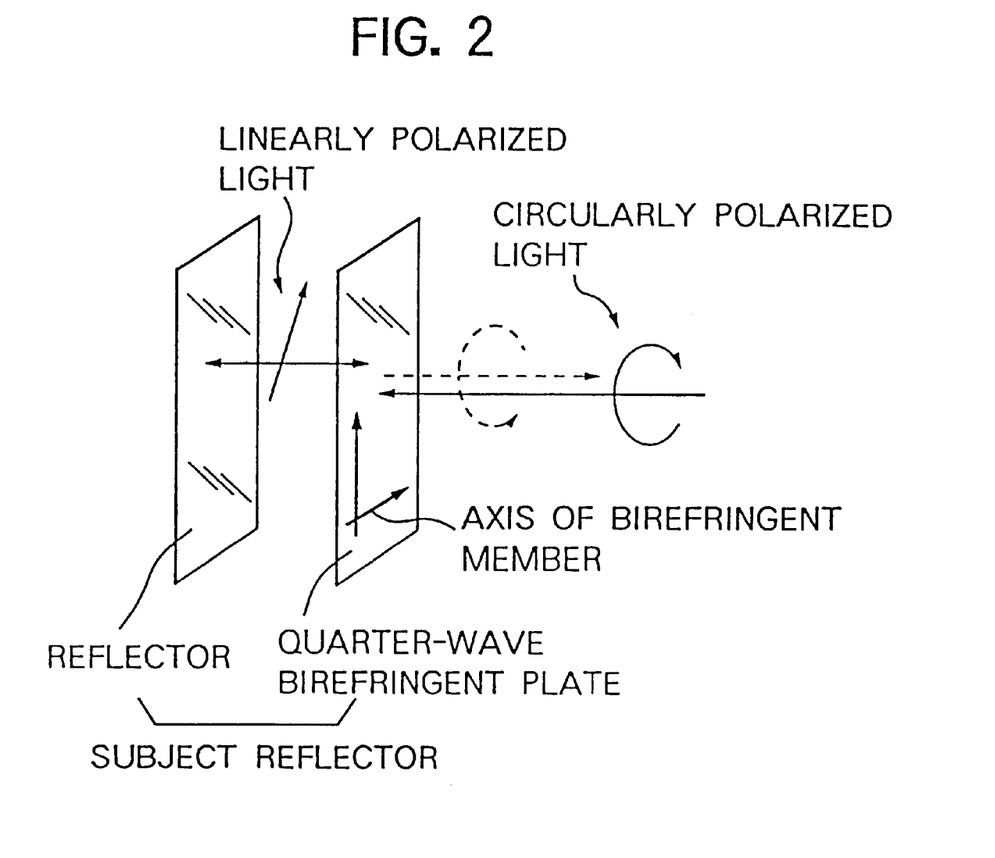
FIG. 2 is a detailed explanatory view showing a reflection of the circularly polarized light caused by the object reflector.
Figure 3:
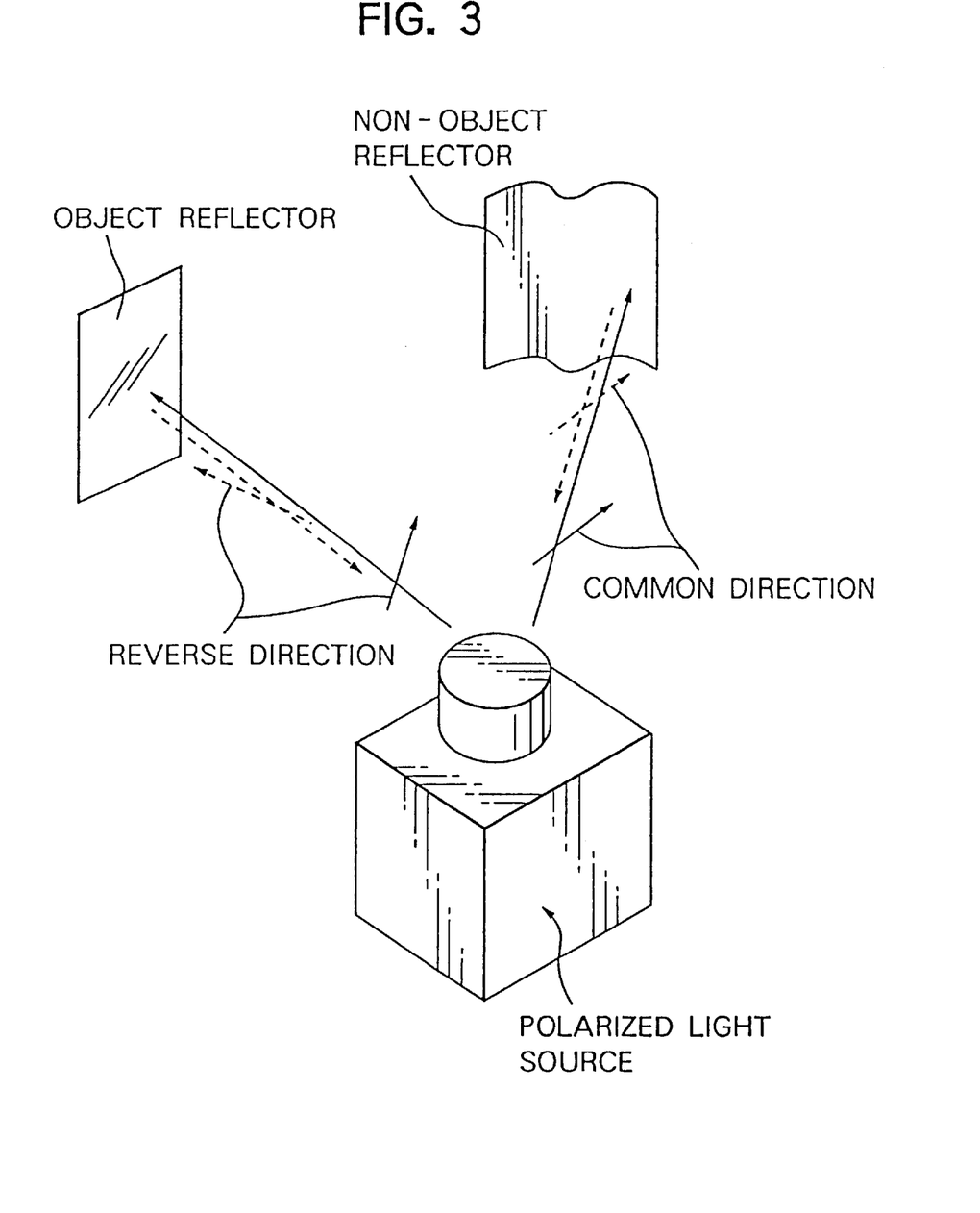
FIG. 3 is a schematic view showing a reflection of the linearly polarized light caused by the object reflector.
Figure 4:
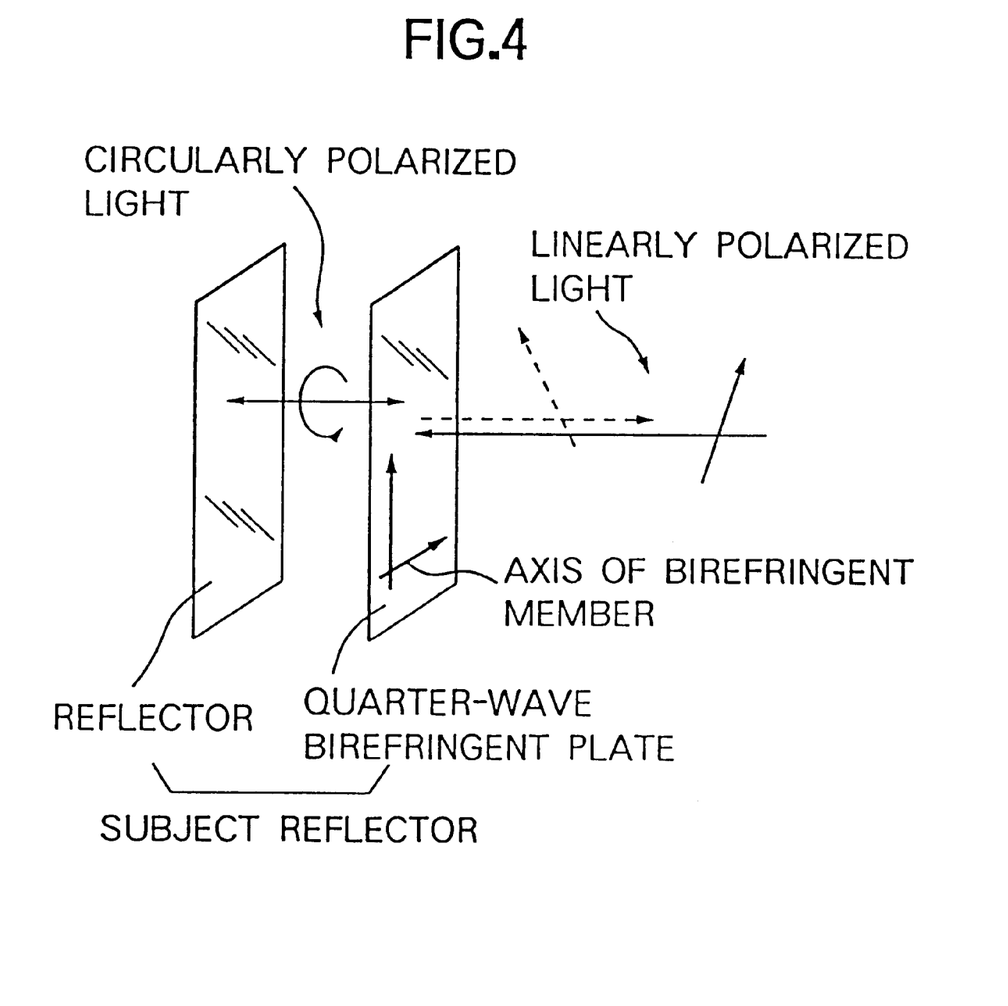
FIG. 4 is a detailed explanatory view showing a reflection of the linearly polarized light caused by the object reflector.

FIGS. 1~4 show the conditions in which the direction of polarization of the light can be changed by the birefringent member. FIG. 1 shows the reflections of the circularly polarized light both at the object and the non-object reflectors. FIG. 2 shows the condition of the circularly polarized light entered into the object reflector. FIGS. 3 and 4 show the conditions as to the linearly polarized light corresponding to FIGS. 1 and 2, respectively.

2. The method for preventing the multiple reflection is based on a fact that the reflection on the glitter surface such as a glass surface has a characteristic of polarization. This characteristic of polarization uses a reflection characteristic of the linearly polarized light to reflect only a light having a component of specified direction.

Figure 5:
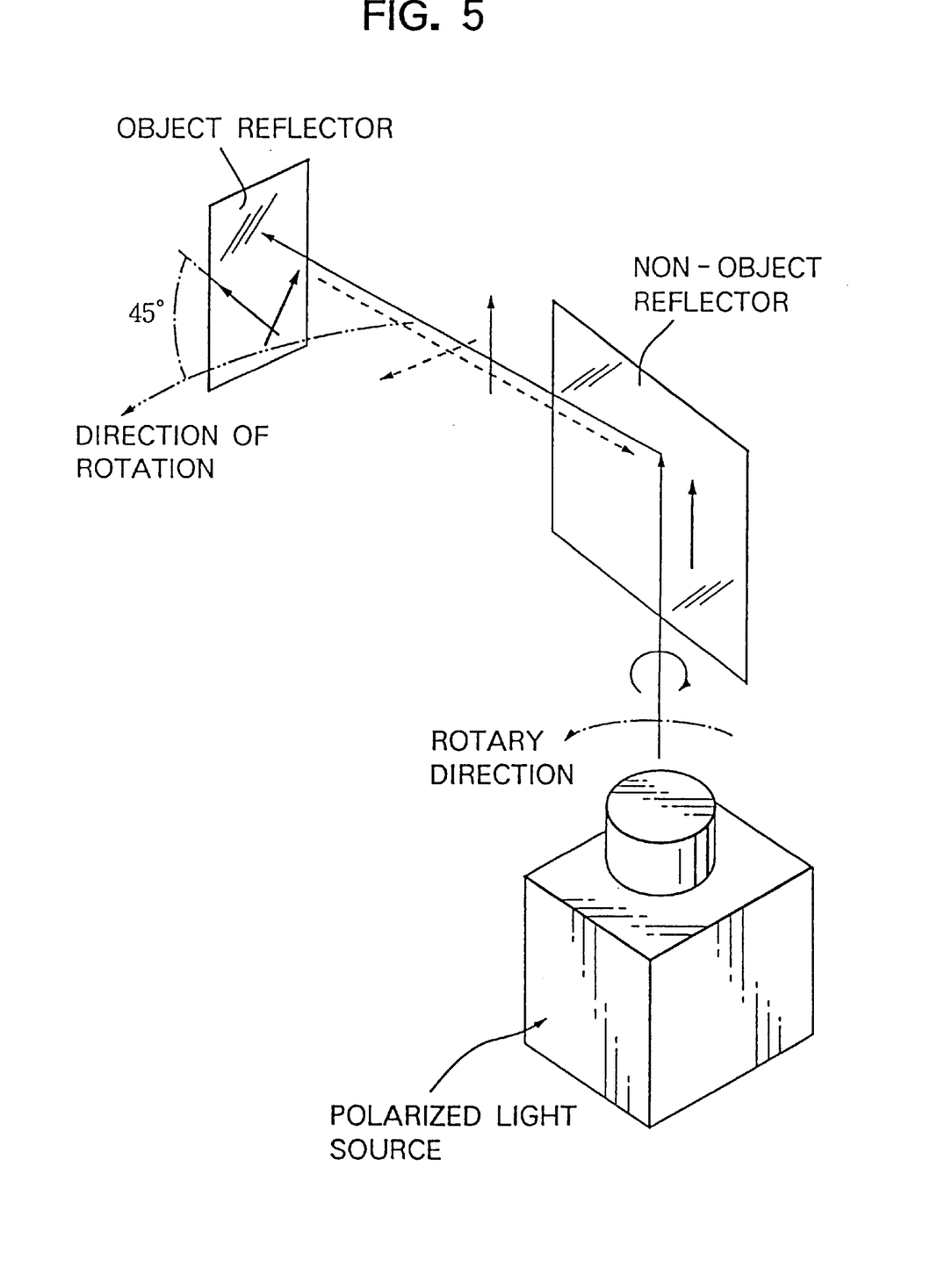
FIG. 5 is an explanatory view showing that the scanned circularly polarized light reflected by any member other than the object reflector does not return to the detecting apparatus.
Figure 6:
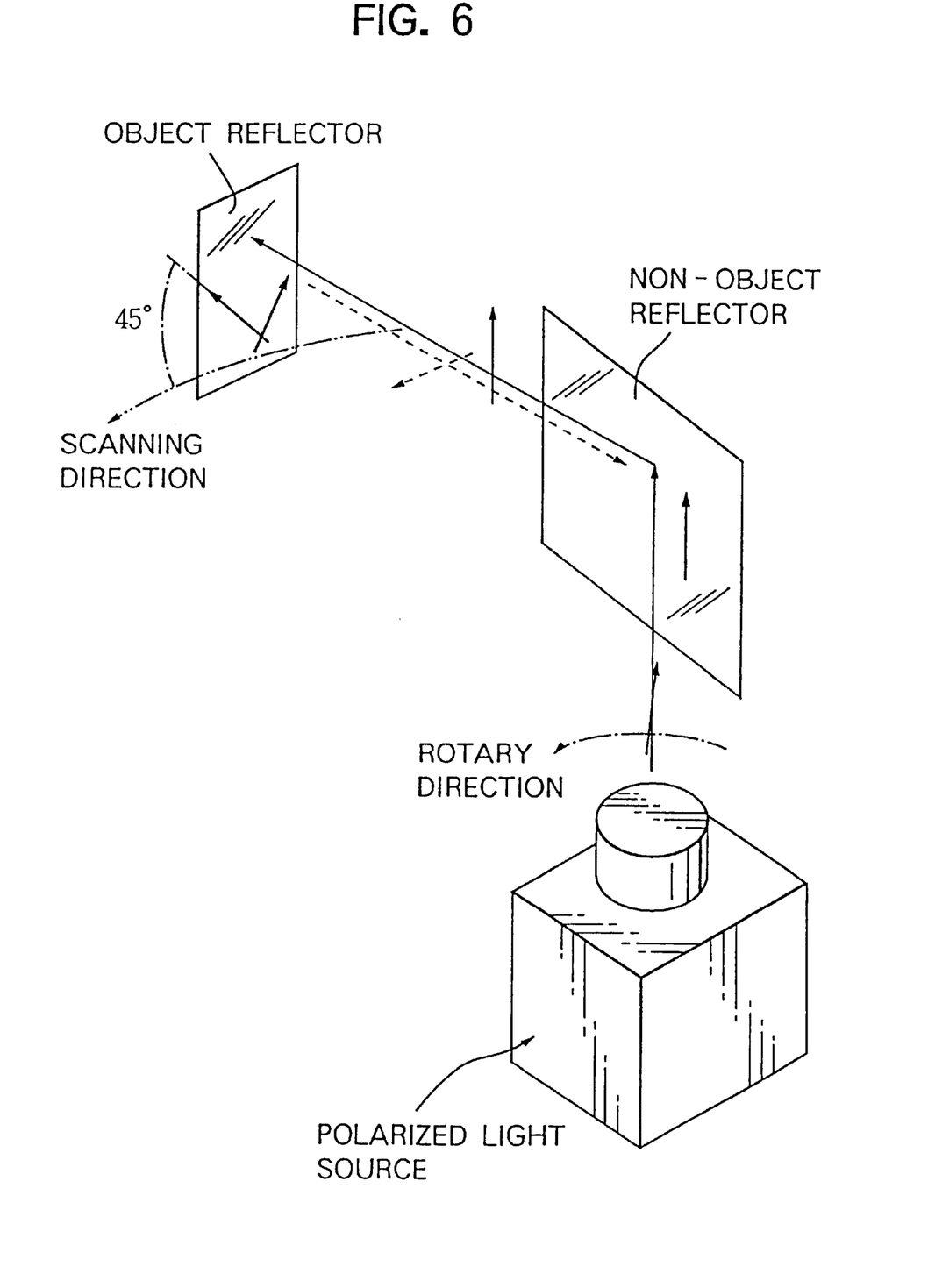
FIG. 6 is an explanatory view showing that the scanned linearly polarized light reflected by any member other than the object reflector does not return to the object reflector detecting apparatus.

More particularly, it uses a nature that the reflected light becomes a linearly polarized light due to the characteristic of polarization when the light from the light source is a circularly polarized light. That is, by arranging the axis of the birefringent member of a quarter-wave attached onto a whole surface of the object reflector about 45° relative to the scanning direction (i.e. the direction of rotation) of the polarlized light source, the direction of the linearly polarized light running from the reflecting surface toward the object reflector becomes a condition orthogonally crossing with the direction of the characteristic of polarization of the opposite surface when the linearly polarized light is reflected by the object reflector. Thus, this light becomes difficult to be reflected when it is again returned to the reflecting surface and in the event does not return to the polarized light source of the object reflector detecting apparatus. FIG. 5 shows this condition.

Figure 7:
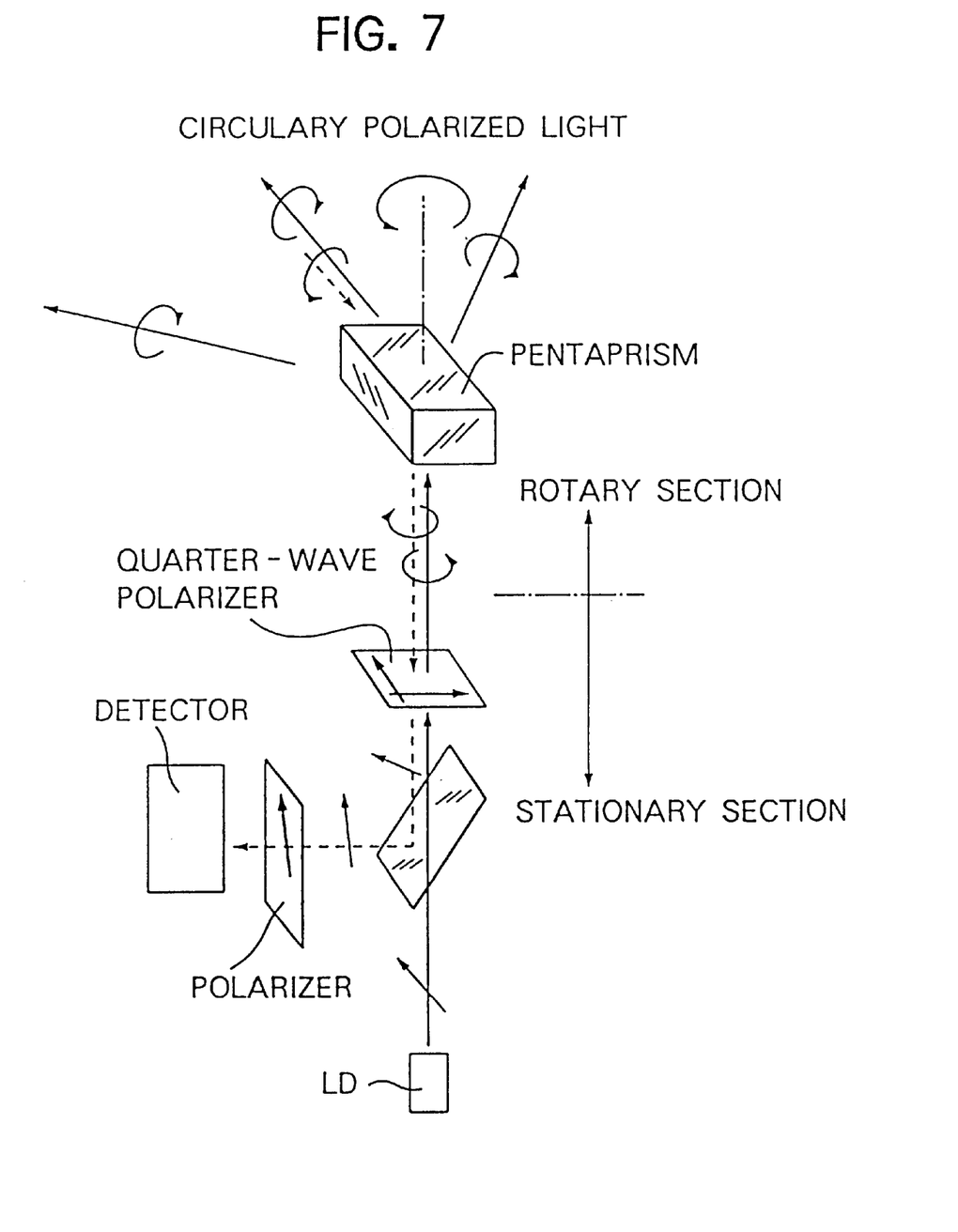
FIG. 7 is an explanatory view showing the optical system of the object reflector detecting apparatus of the present invention for rotary scanning a circularly polarized luminous flux.

In addition, when the light from the light source of the object reflector detecting apparatus is a linearly polarized light, the same effect can be achieved by arranging the direction of polarization of that light to correspond to the scanning direction of the light source so that the direction of polarization corresponds to or orthogonally crosses with the direction of the characteristic of polarization of the reflecting surface. When the linearly polarized light from the object reflector detecting apparatus orthogonally crosses with the characteristic of polarization of the reflecting surface, the intensity of light will be damped by the characteristic of polarization of the reflecting surface. On the other hand, when the linearly polarized light from the object reflector detecting apparatus corresponds to the direction of the characteristic of polarization of the reflecting surface, the light once passes through the reflecting surface. However, since the direction of polarization of the light is changed by the object reflector to the orthogonal direction similarly to the circularly polarized light, the intensity of the light will be damped at the reflecting surface in a return path. FIG. 7 shows the case when the linearly polarized light from the object reflector detecting apparatus corresponds to the direction of the characteristic of polarization of the reflecting surface.

3. In the object reflector detecting apparatus, it is a common way to rotate the irradiation direction of light by arranging the semiconductor laser of the light source at a stationary section in view of the stability of the axis of rotation and by rotating optical elements such as a pentagonal prism and the like. In this case, although the semiconductor laser is linearly polarized, the direction of polarization is also rotated accompanying with the rotation of the irradiation direction.

The method for defining the direction of polarization is based on a fact that the direction of rotation of circularly polarized light does not change although the apparatus is rotated around the optical axis. That is, as shown in FIG. 7, the semiconductor laser changes the linearly polarized light to the circularly polarized light using the birefringent member providing a quarter-wave phase difference. When passing the circularly polarized light through a rotary optical element such as a pentagonal prism, the light emitted from the optical element is not influenced by the rotating optical element and thus the direction of rotation of this circularly polarized light is always kept same.

Figure 8:
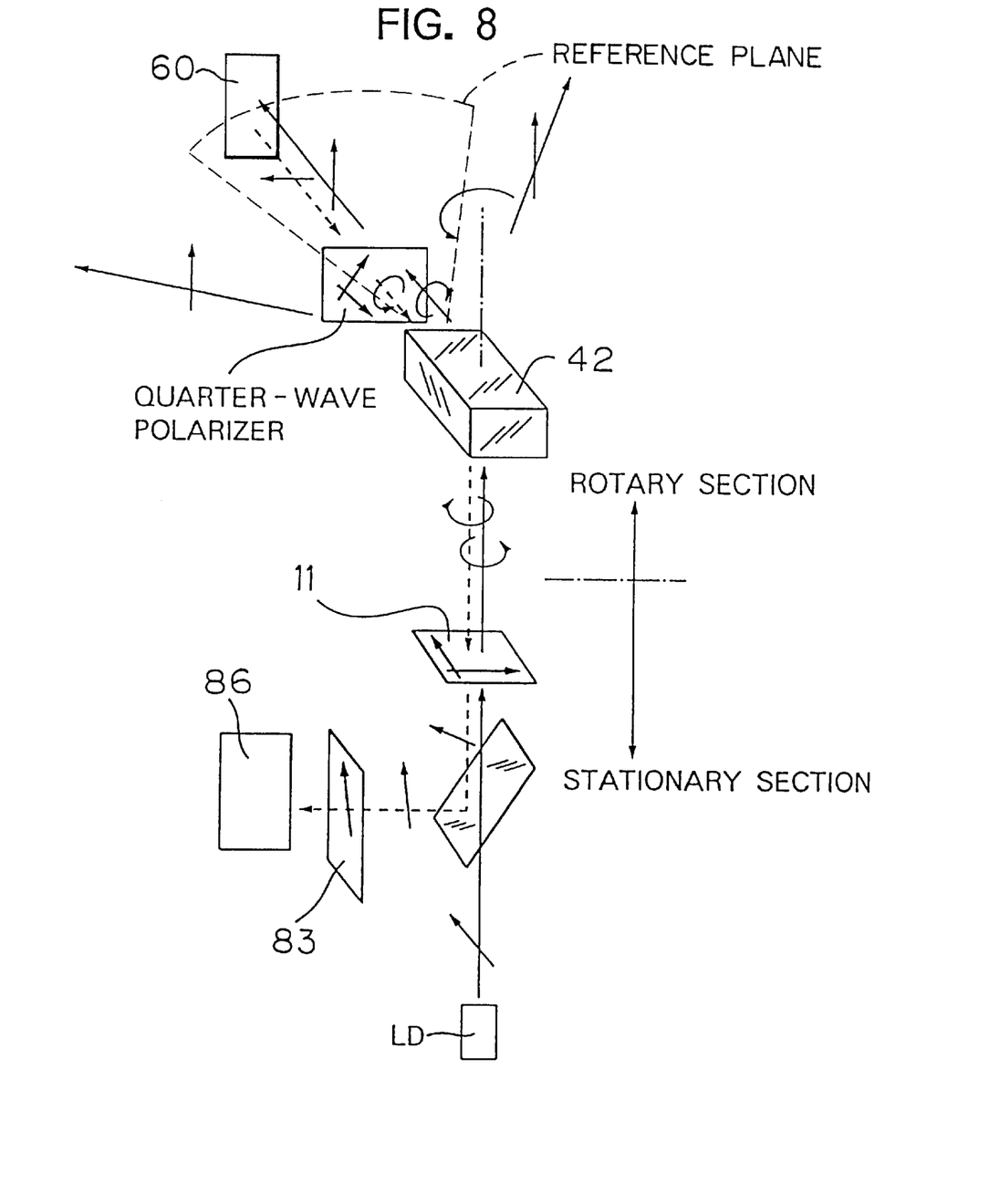
FIG. 8 is an explanatory view showing the optical system of the object reflector detecting apparatus of the present invention for rotary scanning a linearly polarized luminous flux.

That mentioned above is a case to define the light emitted from the apparatus to the circularly polarized light. On the other hand, when defining the light emitted from the apparatus to the linearly polarized light, this is achieved by passing again the circularly polarized light through the birefringent member providing the quarter-wave phase difference arranged at the axis of rotation as shown in FIG. 8. The direction of the linearly polarized light can be freely chosen by rotating the axial direction of the birefringent member.

The detecting section is adapted to detect only the reflected light from the object reflector by selecting, using the polarizer, the linearly polarized light which is passed through the birefringent member providing the quarter-wave phase difference and changed from the reflected circularly polarized light passed through the pentagonal prism.

DESCRIPTION OF THE PREFERRED EMBODIMENT

A preferred embodiment of an object reflector detecting apparatus of the present invention will be hereinafter described with reference to the accompanying drawings.

Figure 9:
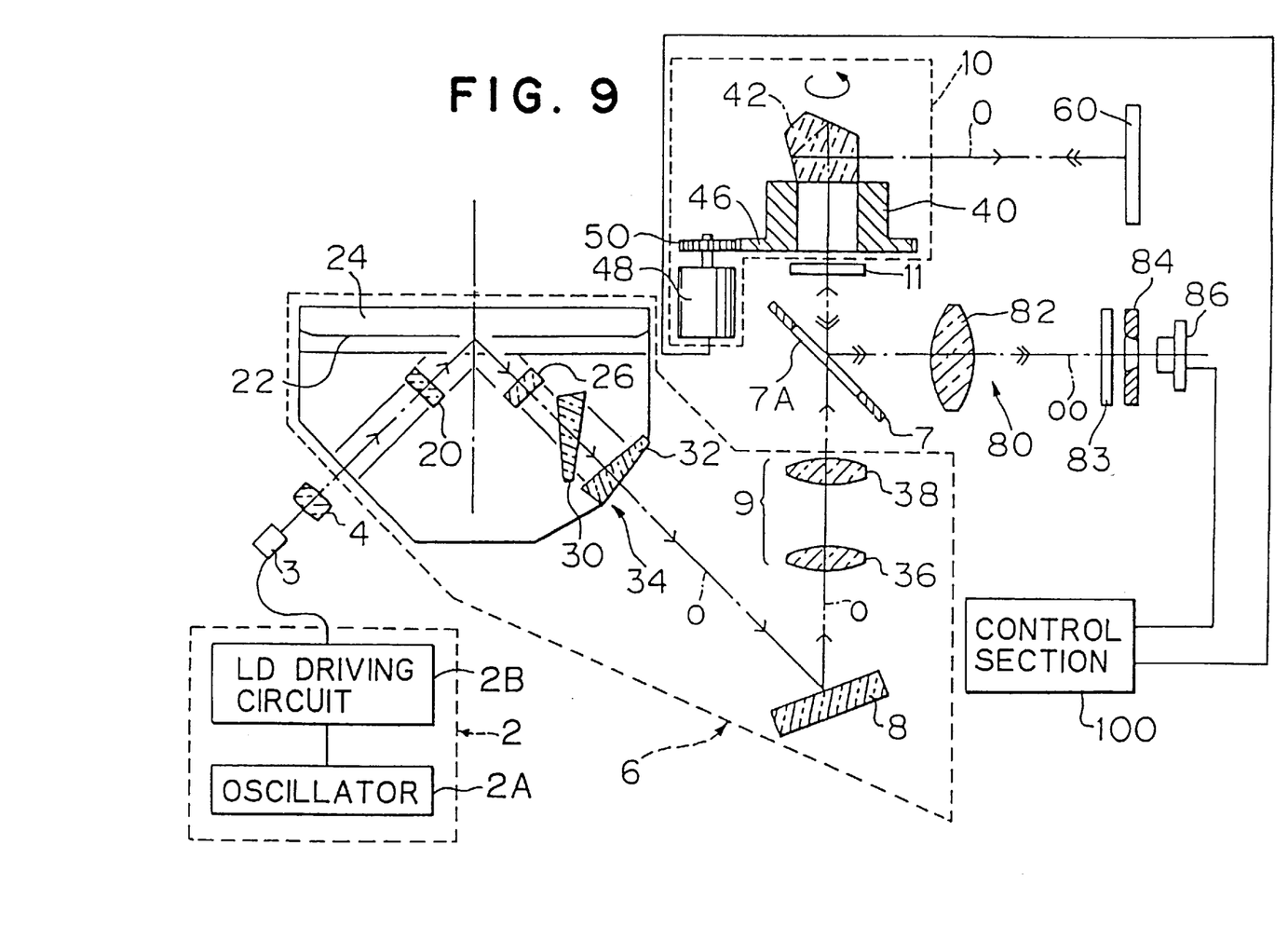
FIG. 9 is a schematic view showing the optical system of the object reflector and the object reflector detecting apparatus of the present invention.

One embodiment of a rotary laser irradiating apparatus having an object reflector detecting apparatus of the present invention will be hereinafter described. As shown in FIG. 9, the rotary laser irradiating apparatus has a series of optical elements arranged on an optical axis O of a laser luminous flux emitted from a semiconductor visible laser 3 driven by a pulse driving circuit 2, these optical elements being a collimator lens 4, a tilt compensating section 6, a reflecting mirror 8, a beam expander 9, an apertured mirror 7 having an aperture 7A through which the optical axis O passes, a birefringent member 11 providing a quarter-wave phase difference, and a beam rotary section 10. The pulse driving circuit 2 comprises a laser oscillator 2A and an LD driving circuit 2B. The rotary laser irradiating apparatus may be constructed without the tilt compensating section 6.

The tilt compensating section 6 is an optical system i.e. a liquid compensator adapted to reflect the laser luminous flux emitted from the semiconductor visible laser 3 always at a constant angle relative to the vertical despite the inclination of a polarized light source (not shown) and comprises a sealed glass 20, an oil bath 24 having a reflecting surface 22 of a liquid back, a sealed glass 26, and a biaxial tilt compensation balance adjustor i.e. an optical axis adjusting section 34 including a pair of prism members 30 and 32 for polarizing the optical axis O. The beam expander 9 comprises a pair of lenses 36 and 38 each having a different focal length and is adapted to expand the width of the laser luminous flux.

The beam rotary section 10 is an optical system adapted to rotary scan in a horizontal reference plane the laser luminous flux vertically upwardly entered thereto and comprises a pentagonal prism 42 mounted on a rotary support 40. A gear 46 mounted on the bottom of the rotary support 40 meshes with an output gear 50 of a motor 48 driving the rotary support 40 via a reduction gear unit (not shown). The motor 48 is controlled by a control section 100.

Figure 10:
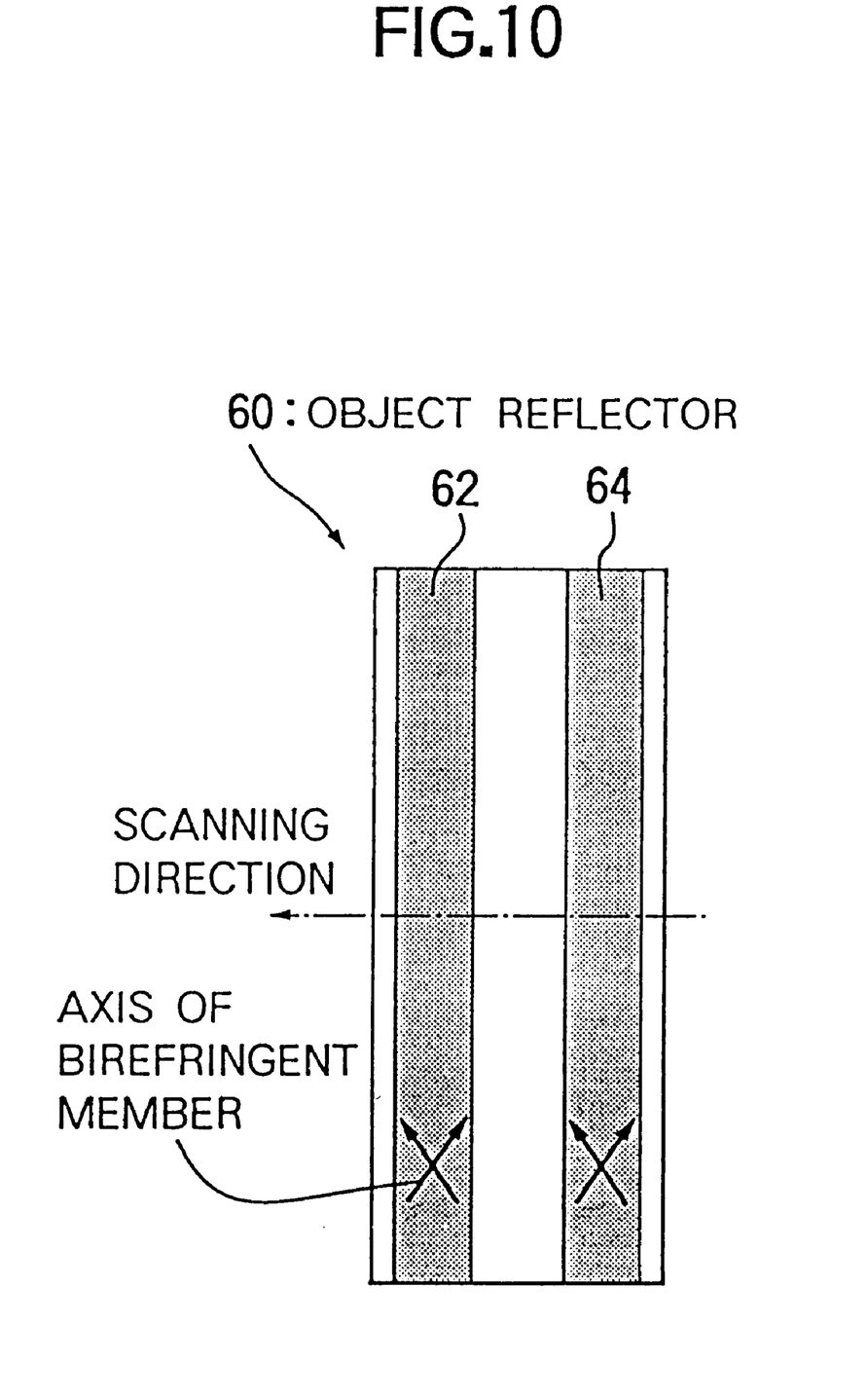
FIG. 10 is a front elevational view showing the object reflector of the present invention.
Figure 11:
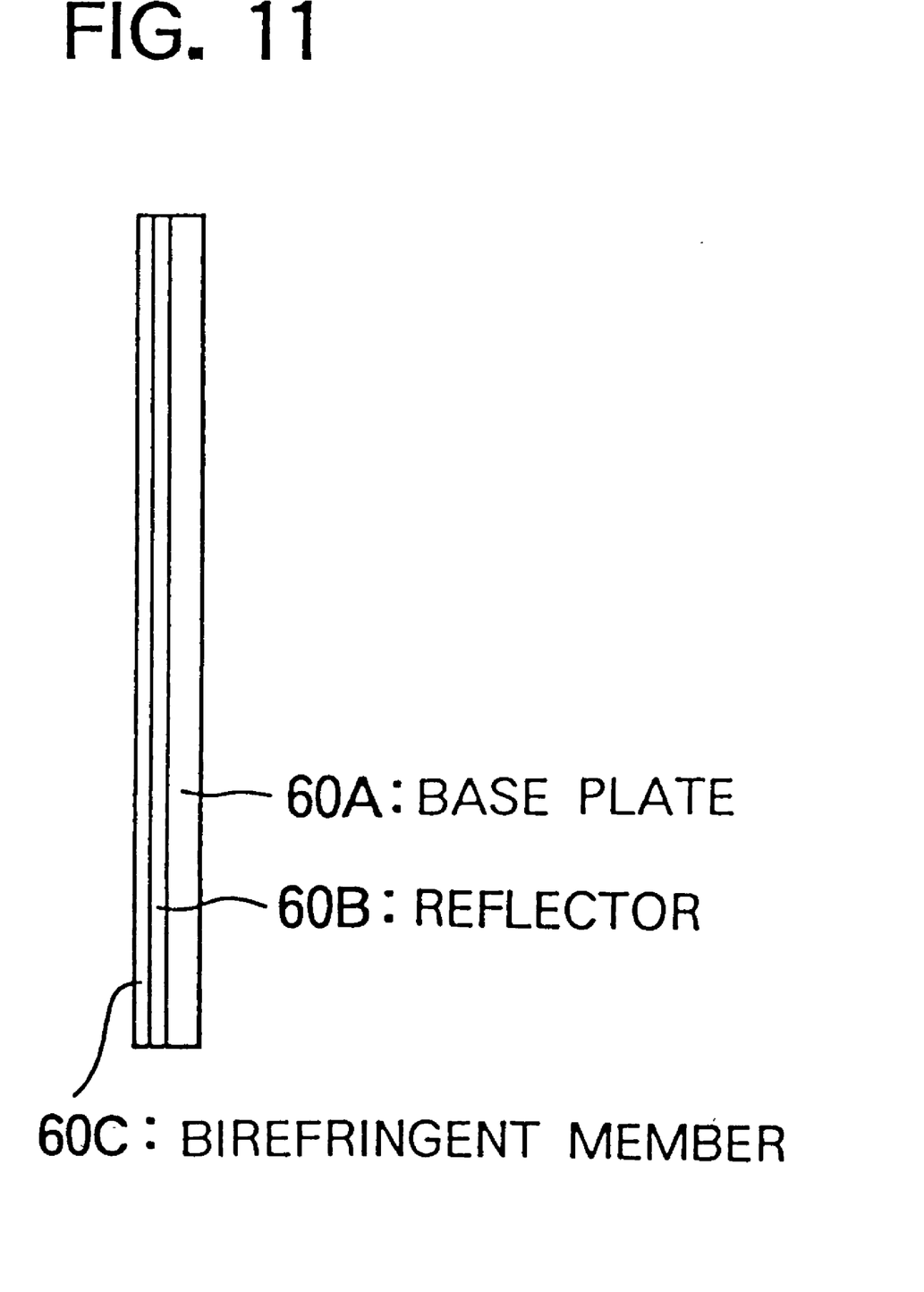
FIG. 11 is a side elevational view showing the object reflector of the present invention.

An object reflector 60 for reflecting the laser luminous flux emitted from the pentagonal prism 42 is formed by two reflecting zones 62 and 64 vertically extending and spaced apart from each other as shown in FIG. 10 and comprises a substrate 60A, a reflector 60B, and a birefringent member 60C providing a quarter-wave phase difference, the reflector 60B and the birefringent member 60C being adhered to the substrate 60A. The reflector 60B may be formed by a plurality of retroreflection members such as corner-cube prisms or spherical reflectors. The birefringent member 60C is arranged at about 45° relative to the scanning direction (direction of rotation) of the circularly polarized light of the laser luminous flux emitted from the pentagonal prism 42.

A laser luminous flux detecting section 80 comprises a condenser lens 82, a polarizer 83, a pinhole plate 84 and a photoelectric transfer element 86, these elements being arranged on an optical axis OO of reflected light and spaced apart by an appropriate distance from each other.

The output of the pulse driving circuit 2 forming the electric system of the rotary laser irradiating apparatus is inputted to the semiconductor visible laser 3. The electric system further includes the photoelectric transfer element 86 for receiving the laser luminous flux reflected by the object reflector 60, the motor 48 and the control section 100. The control section 100 performs a control for simplifying the view of the laser luminous flux, for example, by reciprocally scanning the laser luminous flux only within an angular range formed by two object reflectors 60.

The optical operation of the rotary laser irradiating apparatus will then be described. The linearly polarized laser luminous flux emitted from the semiconductor visible laser 3 is compensated in its direction so that it is directed to a predetermined direction, and then enters to the birefringent member 11 through the aperture 7A of the apertured mirror 7. The linearly polarized laser luminous flux is transformed into the circularly polarized light by the birefringent member 11 and then is rotated by the pentagonal prism 42 in a horizontal reference plane.

When the circularly polarized laser luminous flux enters the object reflector 60, it is transformed into the linearly polarized light by the birefringent member 60C of the object reflector 60, is reflected by the reflector 60B, enters again to the birefringent member 60C and is returned thereby to the circularly polarized light, and then enters to the pentagonal prism 42. The circularly polarized laser emitted downwardly from the pentagonal prism 42 is transformed into the linearly polarized light by the birefringent member 11, reflected by the apertured mirror 7 at a portion other than the aperture 7A, and then enters the polarizer 83. The linearly polarized laser luminous flux of a predetermined direction is selected by the polarizer 83 and enters to the photoelectric transfer element 83 to be detected thereby.

Modifications of the embodiment illustrated above will be further described. Although the object reflector 60 is formed by two reflecting zones 62 and 64 in the illustrated embodiment, the object reflector 60 may be formed by only one reflecting zone when influence of the extraneous light is not so great.

In addition, although the light source i.e. the semiconductor visible laser and the detecting section are mounted on the stationary body and the laser luminous flux is rotary scanned by rotating only the pentagonal prism for a laser luminous flux rotation in the illustrated embodiment, it may be possible to rotary scan the laser luminous flux by rotating the semiconductor visible laser and the detecting section. In this case, the direction of the polarized light of the rotary scanned laser luminous flux is not rotated.

Although it is considered that the laser luminous flux emitted from the semiconductor visible laser is the linearly polarized light, it is, in actuality, not a purely linearly polarized light and thus contains a noise component. When the noise component exceeds an allowable amount, an additional polarizer may be arranged on the optical axis of the semiconductor visible laser to eliminate the noise component.

According to the combined object reflector detecting apparatus of the present invention, it is possible to surely identify the predetermined object reflector with effectively expelling the noise component which is a reflected light from any member other than the predetermined object reflector. Also according to the rotary irradiating apparatus of the present invention, it is possible to surely irradiate the predetermined angle range.

What is claimed is:

1. Apparatus for detecting polarized light comprising:
    a polarized light source for emitting linearly polarized light;
    polarizing means for polarizing the linearly polarized light emitted from said polarized light source;
    rotary means for irradiating said polarized light on a reference plane generated by rotation of said rotary means about a vertical axis of rotation;
    an object reflector positioned to reflect light emitted by said rotary means, said object reflector comprising at least one retro-reflective member and a quarter-wave birefringent member disposed in front of said at least one retro-reflective member, and said at least one retro-reflective member and said birefringent member being configured so that light impinging on said object reflector and light reflected from said object reflector have different directions of polarization;
    detector means for detecting only the polarized light reflected from said object reflector; and
    control means for moving the emitted polarized light in said reference plane on said object reflector.

2. The apparatus of claim 1, wherein said polarizing means comprises a first polarizing member interposed between said polarized light source and said rotary means for circularly polarizing the linearly polarized light emitted from said polarized light source; and
    a second polarizing member interposed between said rotary means and said object reflector.

3. The apparatus of claim 2, wherein each of said first and second polarizing members comprises a birefringent member.

4. The apparatus of claim 2, herein said second polarizing member linearly polarizes the polarized light emitted by said rotary means.

5. The apparatus of claim 1, wherein said birefringent member of said object reflector changes the polarization direction of light reflected from said object reflector to be orthogonal to the polarization direction of light impinging on said object reflector.

6. The apparatus of claim 1, wherein said member has an optic axis inclined at an angle of about 45° with respect to the polarization direction of the linearly polarized light emitted by said polarized light source.

7. The apparatus of claim 1, wherein said object reflector includes at least first and second spaced retro-reflective zones.

8. Apparatus for detecting polarized light comprising:

a polarized light source for emitting linearly polarized light, polarizing means for polarizing the linearly polarized light emitted from said polarized light source;

rotary means for irrdiating said polarized light on a reference plane generated by rotation of said rotary means about a vertical axis of rotation;

an object reflector positioned to reflect light emitted by said rotary means, said object reflector comprising at least one retro-reflective member and a quarter-wave birefringent member disposed in front of said at least one retro-reflective member, and said at least one retro-reflective member and said birefringent member being configured so that light impinging on said object reflector and light reflected from said object reflector have different directions of polarization;

detector means for detecting only the polarized light reflected from said object reflector; and control means for rotationally scanning the emitted polarized light in said reference plane on said object reflector.

9. The apparatus of claim 8, wherein said polarizing means comprises a first polarizing member interposed between said polarized light source and said rotary means for circularly polarizing the linearly polarized light emitted from said polarized light source; and a second polarizing member interposed between said rotary means and said object reflector.

10. The apparatus of claim 9, wherein said second polarizing member linearly polarizes the polarized light emitted by said rotary means.

11. The apparatus of claim 8, wherein said object reflector includes at least first and second spaced retro-reflective zones.

12. Apparatus for detecting polarized light comprising:

a polarized light source for emitting linearly polarized light;

polarizing means for polarizing the linearly polarized light emitted from said polarized light source;

rotary means for irradiating said polarized light on a reference plane generated by rotation of said rotary means about a vertical axis of rotation;

an object reflector positioned to reflect light emitted by said rotary means, said object reflector comprising at least one retro-reflective member and a quarter-wave birefringent member disposed in front of said at least one retro-reflective member, and said at least one retro-reflective member and said birefringent member being configured so that light impinging on said object reflector and light reflected from said object reflector have different directions of polarization;

detector means for detecting only the polarized light reflected from said object reflector; and control means for reciprocally scanning the emitted polarized light in said reference plane on said object reflector.

13. The apparatus of claim 12, wherein said polarizing means comprises a first polaizing member interposed between said polarized light source and said rotary means for circularly polarizing the linearly polarized light emitted from said polarized light source; and a second polarizing member interposed between said rotary means and said object reflector.

14. The apparatus of claim 13, wherein said second polarizing member linearly polarizes the polarized light emitted by said rotary means.

15. The apparatus of claim 12, wherein said object reflector includes at least first and second spaced retro-reflective zones.

* * * * *